US011734586B2

(12) United States Patent
Hewitt et al.

(10) Patent No.: US 11,734,586 B2
(45) Date of Patent: Aug. 22, 2023

(54) DETECTING AND IMPROVING CONTENT RELEVANCY IN LARGE CONTENT MANAGEMENT SYSTEMS

(71) Applicant: INTERNATIONAL BUSINESS MACHINES CORPORATION, Armonk, NY (US)

(72) Inventors: Trudy L. Hewitt, Cary, NC (US); Kelley Anders, East New Market, MD (US); Steven Edward Atkin, Austin, TX (US); Jonathan D. Dunne, Dungarvan (IE)

(73) Assignee: International Business Machines Corporation, Armonk, NY (US)

( * ) Notice: Subject to any disclaimer, the term of this patent is extended or adjusted under 35 U.S.C. 154(b) by 706 days.

(21) Appl. No.: 16/600,606

(22) Filed: Oct. 14, 2019

(65) Prior Publication Data

US 2021/0110286 A1    Apr. 15, 2021

(51) Int. Cl.
*G06N 5/04*     (2023.01)
*G06N 20/00*    (2019.01)
*G06F 16/93*    (2019.01)

(52) U.S. Cl.
CPC .......... *G06N 5/04* (2013.01); *G06F 16/93* (2019.01); *G06N 20/00* (2019.01)

(58) Field of Classification Search
CPC .......... G06N 5/04; G06N 20/00; G06F 16/93
USPC .......................................................... 706/12
See application file for complete search history.

(56) References Cited

U.S. PATENT DOCUMENTS

| | | | |
|---|---|---|---|
| 5,721,911 | A  |  2/1998 | Ha et al. |
| 6,185,576 | B1 |  2/2001 | McIntosh |
| 7,016,889 | B2 |  3/2006 | Bazoon |
| 8,612,417 | B2 | 12/2013 | Diab |
| 8,917,274 | B2 | 12/2014 | Ma |

(Continued)

OTHER PUBLICATIONS

Ometrics, "Heat Maps, Click Maps, Motion Maps, Click Metrics and more", Do you know where users are having click confusion and what your visitos value?, Ometrics, Accessed on Apr. 25, 2019, 3 pages, https://www.ometrics.com/heat-maps.html.

(Continued)

*Primary Examiner* — Hope C Sheffield
(74) *Attorney, Agent, or Firm* — Brandon L. Stephens; L. Jeffrey Kelly (57) ABSTRACT

A method, a computer system, and a computer program product for managing content relevancy is provided. Embodiments of the present invention may include collecting and analyzing a plurality of data, wherein the plurality of data includes document data, document access data and user data. Embodiments of the present invention may include retrieving topic model content based on the plurality of data. Embodiments of the present invention may include building a machine learning (ML) model to determine one or more topics contained in the topic model content. Embodiments of the present invention may include generating a heatmap based on the user data. Embodiments of the present invention may include building a content relevancy model (CRM) based on the ML model and the heatmap. Embodiments of the present invention may include determining an action state for the document data. Embodiments of the present invention may include storing the CRM.

17 Claims, 5 Drawing Sheets

(56) References Cited

U.S. PATENT DOCUMENTS

| | | | |
|---|---|---|---|
| 2007/0233861 A1* | 10/2007 | Cai | H04L 51/58 |
| | | | 709/225 |
| 2010/0241597 A1 | 9/2010 | Chen | |
| 2012/0144099 A1 | 6/2012 | Yang | |
| 2013/0246383 A1* | 9/2013 | White | G06F 16/9535 |
| | | | 707/723 |
| 2014/0207814 A1 | 7/2014 | Anders | |
| 2015/0339340 A1 | 11/2015 | Dham | |
| 2016/0292734 A1* | 10/2016 | Jia | G06Q 30/0277 |
| 2018/0039399 A1 | 2/2018 | Kaltegaertner | |
| 2018/0121429 A1* | 5/2018 | Agrawal | G06F 16/3326 |

OTHER PUBLICATIONS

Rashid et al. "Preliminary usability testing with eye tracking and FCAT analysis on occupational safety and health websites." Procedia-Social and Behavioral Sciences 97 (2013), pp. 737-744.

Mell et al., "The NIST Definition of Cloud Computing", Recommendations of the National Institute of Standards and Technology, Special Publication 800-145, Sep. 2011, 7 pages.

\* cited by examiner

DETECTING AND IMPROVING CONTENT RELEVANCY IN LARGE CONTENT MANAGEMENT SYSTEMS

BACKGROUND

The present invention relates generally to the field of computing, and more particularly to content management. Companies that create a large amount of digital content and make the content available to customers for external consumption may find difficulty in identifying when the digital content has become stale or outdated compared to new emerging content. Digital content can be a first impression a client has with a company. Stale content can impact client searches and the search may return results that do not resolve a client issue.

SUMMARY

Embodiments of the present invention disclose a method, a computer system, and a computer program product for managing content relevancy. Embodiments of the present invention may include collecting a plurality of data, wherein the plurality of data includes document data, document access data and user data. Embodiments of the present invention may include analyzing the plurality of data. Embodiments of the present invention may include retrieving topic model content based on the plurality of data. Embodiments of the present invention may include building a machine learning (ML) model to determine one or more topics contained in the topic model content. Embodiments of the present invention may include generating a heatmap based on the user data. Embodiments of the present invention may include building a content relevancy model (CRM) based on the ML model and the heatmap. Embodiments of the present invention may include determining an action state for the document data. Embodiments of the present invention may include storing the CRM.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

As previously described, companies that create a large amount of digital content and make the content available to customers for external consumption may find difficulty in identifying when the digital content has become stale or outdated compared to new emerging content. Digital content can be a first impression a client has with a company. Stale content can impact client searches and the search may return results that do not resolve a client issue. Additionally, clients may become frustrated when a search engine returns irrelevant results that do not resolve the situation.

Content may also remain useful, however, the metadata associated with the content or document may become irrelevant in searches or the metadata may become obsolete, outdated or stale. Due to the large volume of content, teams of people don't have enough time or capability to review all the content for the number of times a document was accessed, the time periods the document has been accessed or the particular areas of the document that a user was reading or interested in. Therefore, it may be advantageous to, among other things, create a solution that predicts and identifies when content is getting stale, to determine when the content is no longer relevant and to identify when metadata is becoming obsolete.

The following described exemplary embodiments provide a system, method and program product for content management. As such, embodiments of the present invention have the capacity to improve the technical field of content management by creating a system, a method and a program product to dynamically ascertain and predict when the content is getting stale or has become obsolete. More specifically, based on the collection of data relating to the document or content, if the content is becoming stale, remedial action may be taken to ensure the content remains fresh or the content is retired. When content is predicted to be stale, a dynamic adjustment will be made to retire, update or tag for review the content or the associated content metadata. The dynamic adjustments may be made by creating a model that uses collected data, a statistical probability modeling of events and action state thresholds to determine if adjustments should be made to the content based on trends, changes in search relevancy or tying the content back to the physical content management and search indexing systems. Efficient, fast, relevant and accurate search result performance for clients will be provided by removing or updating the stale content.

According to an embodiment, data relating to documents and accessibility to documents are retrieved. Document data may include information relating to the document content, topic, domain or subject matter. Document access data may include information relating to when, by whom, how often or for what purpose a document is accessed. For example, topic modeling may be used to determine key terms used within a document corpus and document terms may be data mined as the terms associated with a probabilistic float value between 0 and 1, a log likelihood. Document access data may be obtained using a web-traffic data capture or a crowd-sourced engagement activity, for example, reported by a web analytics engine. The retrieved data relating to the document and the access to the document may be stored, for example, on a database, on a server, the cloud or on a client device.

Topic modeling may be used to identify and collect or retrieve data, for example, using latent Dirichlet allocation (LDA) for medium to large size corpora and BiTerm for smaller size corpora. Topic modeling may use a statistical model to identify topics within a collection of documents. Similar to data mining, topic modeling performs text-mining to identify topics, abstract topics and semantic structures in a document or in a collection of documents.

For example, an analytics application may provide information relating to how often, when and who has searched for and accessed documents from a search engine or from a repository. The topic or domain topic of the documents may also be obtained. The retrieved data relating to a document may include the topic of the document and the retrieved data relating to the accessibility to the document may include times, dates and accessibility activity.

According to an embodiment, a heatmap may be generated based on the content that is accessed and read by users. For example, an image of a heatmap may overlay the document with some visibility of the document (i.e., the color of the heatmap overlay has some transparency). The heatmap display may be captured by using a camera that is facing the user, such as a computer camera, a smart phone, virtual reality glasses or a smart device. The heatmap coloring will overlay the area of the document or content that the user is viewing, and the density of the color may be higher (i.e., less transparency) if the area is viewed more by the user.

According to an embodiment, data being collected from an individual or a user, such as user data, user profile data, user preferences, user biometric data, user voice data or user viewing or eye gazing data and being transmitted to and received by computing devices, a content relevancy program may receive consent or a response from the user, via an opt-in feature or an opt-out feature, prior to commencing the collecting of data or the monitoring and analyzing of the collected data. For example, in some embodiments, the content relevancy program may notify the user when the collection of data begins via a graphical user interface (GUI) or a screen on a computing device. The end user may be provided with a prompt or a notification to acknowledge an opt-in feature or an opt-out feature.

According to an embodiment, a content relevancy model (CRM) is built or created using the collected data, the topic model content and the generated heatmap. According to an embodiment, the CRM may be used to decide or arbitrate whether an action state of the content, document or metadata should stay as-is, require a content boost to increase propagation, update portions of the content and republish, update the metadata and republish or retire the content.

According to an alternate embodiment, in addition to internet search content and blog content, the described embodiment may also be used for a ticketing structure or ticket routing by crawling through the content development repository and noting which ticketing items should be updated. For example, tickets being created, routed and assigned in a company for internet services assistance. Server-side database structures will have improved service and indexing times by using a content relevancy program. Both SQL and non-SQL (i.e., micro service structures) may be used.

According to an alternate embodiment, the state of the content may also be expanded and applied to other content that matches the criteria and traits of the original documentation and may mirror the change in action state. The action state may include, for example, one of stay as-is, require a content boost to increase propagation, update portions of the content and republish, update the metadata and republish or retire the content. Mirroring the change in state of the expanded content may enable the content relevancy program to create groupings that may change the state of the expanded content without having to manually scan each document or have an individual review and approve the state change.

According to an alternate embodiment, a threshold may be created that requires administrator actions, such as having an administrator set how similar content or documents need to be in order for a grouping to be created. Additionally, the content relevancy program may anticipate or predict changes in the future state of the content by simulating the content against similar content that has a changed state but does not match a criteria threshold required for a dynamic state change. If the predicted state change for the content comes within a standard deviation, then the content relevancy program may generate a notification for review by an administrator, a user or a company and to take appropriate action.

According to an alternate embodiment, content that is retained or relevant to consolidate may be merged into content portions. According to an alternate embodiment, in addition to changing the state of an entire content or document, the content relevancy program may also change the state of a portion of the document such that the document has varying states or multiple states within one document. According to an alternate embodiment, in addition to text documents, action states may also be applied to unstructured content such as audio files, video files or image files.

Figure 1:
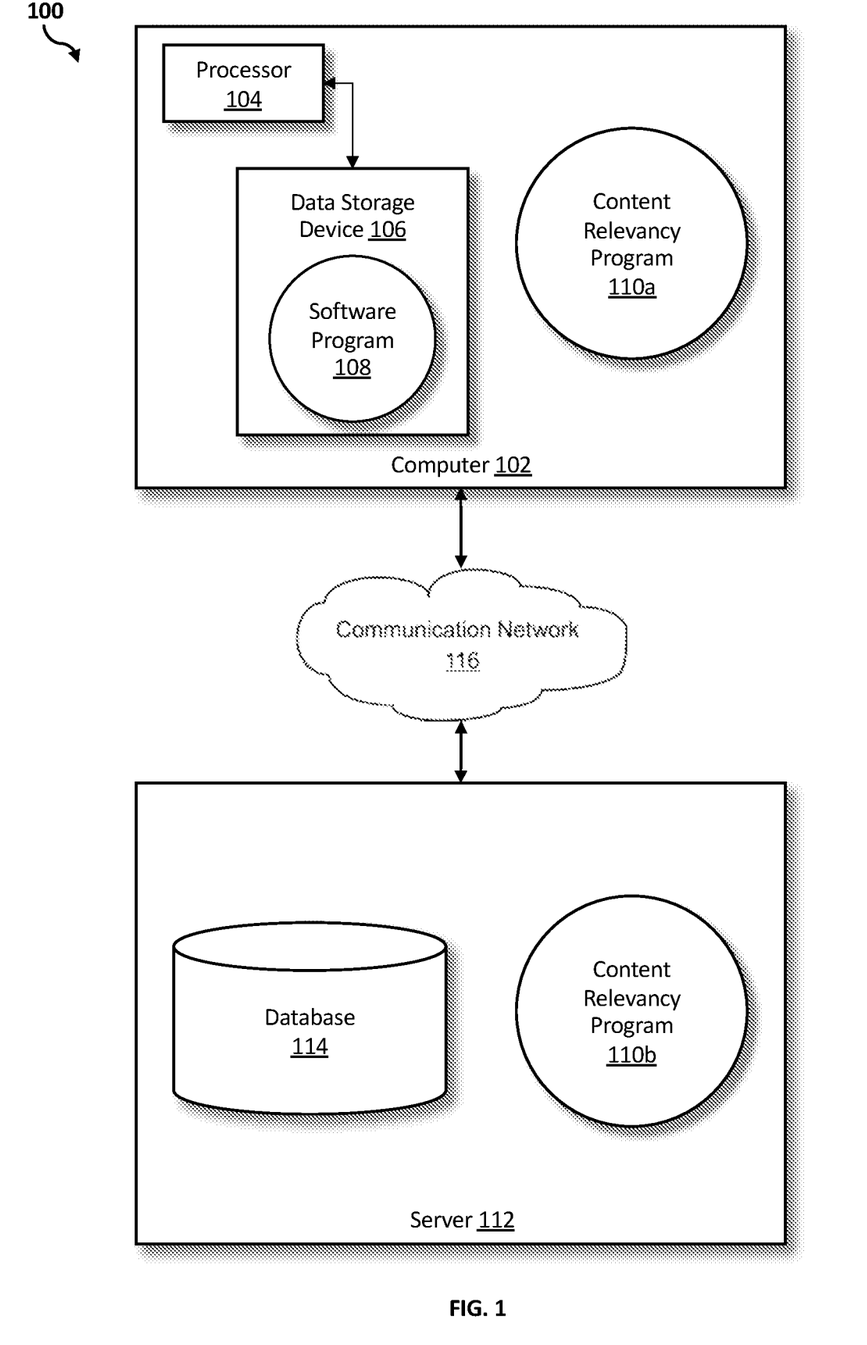
FIG. 1 illustrates a networked computer environment according to at least one embodiment.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a content relevancy program 110a. The networked computer environment 100 may also include a server 112 that is enabled to run a content relevancy program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 3, server computer 112 may include internal components 902a and external components 904a, respectively, and client computer 102 may include internal components 902b and external components 904b, respectively. Server computer 112 may also operate in a cloud computing service model, such as Software as a Service (SaaS), Analytics as a Service (AaaS), Blockchain as a Service (BaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the content relevancy program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the content relevancy program 110a, 110b (respectively) to detect and improve content relevancy in content management systems. The content relevancy method is explained in more detail below with respect to FIG. 2.

Figure 2:
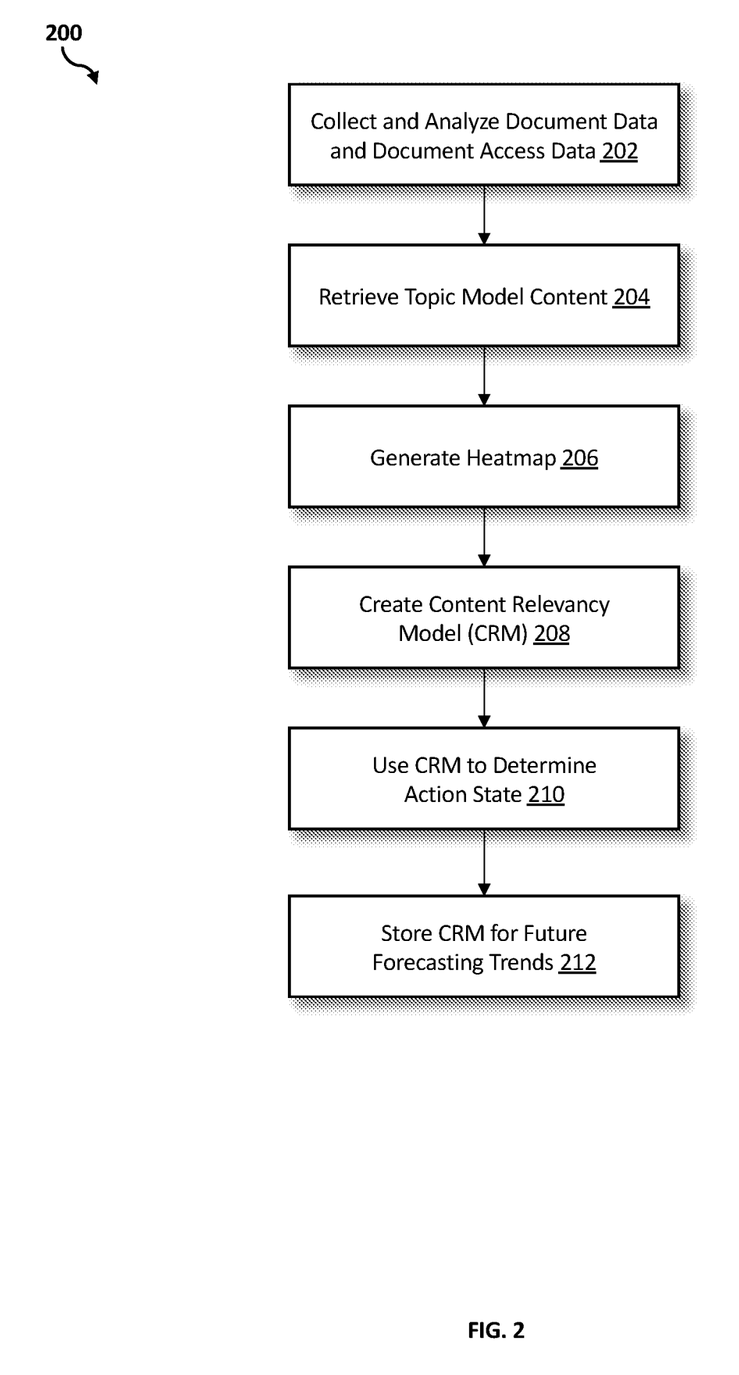
FIG. 2 is an operational flowchart illustrating a process for detecting and improving content relevancy in a content management system according to at least one embodiment.

Referring now to FIG. 2, an operational flowchart illustrating the exemplary content relevancy process 200 used by the content relevancy program 110a, 110b according to at least one embodiment is depicted.

At 202, document data and document access data are collected and analyzed. Document data and access to the document data may be collected and analyzed, for example, using latent Dirichlet allocation (LDA) or BiTerm for machine learning topic and sentiment analysis modeling. Document data may be retrieved from databases, knowledgebases or corpora and a determination may be made as to when the document has been accessed or accessed and edited. Crowdsourced document engagement may also be collected and analyzed. For example, an analytics engine or an analytics software application may report search information and demographics relating to different searches and varying domains. Search information may be reported on an analytics application that include, for example, direct searches, paid searches, referral searches, email searches or social searches as they relate to different domains. Varying domains may include, for example, retail services, technology services, automotive services, industrial services, business services, legal services, medical services or financial services. Additionally, ecommerce conversion rates may be calculated and provided. The collected and analyzed document data and document access data may be stored on a database, corpora or knowledgebase for further analysis.

Additionally, user data may be collected. The user data may be collected as an initial sample, at regular intervals (e.g., day, week or month), or in real time and continuously. For example, a 6-month sample may be collected initially to provide an initial model and assessment. The model may be updated at each collection interval. If user data is collected in real-time, then the data may flow, for example through a JSON type of structure via a message queue and the message may be analyzed in real-time. The opt-in notification may be presented to the user before the collection of data, for example, via an alert, before the data is collected unless there is a different type of alert agreement in place created with the user at a previous time.

At 204, topic model content is retrieved. The topic model content may be retrieved from the database or the corpus of data that is storing the analyzed and collected data at step 202. The collected document data and document access data may be retrieved and used to create a machine learning model. The machine learning model may include a topic model used to determine the types of topics contained on the corpora. A document level may also be used to determine the document placement in the content or topic hierarchy. For example, a document level may include a parent document to a child document or to multiple documents with varying levels of hierarchy. Various NLP and topic modeling algorithms may be used to make the determination or to identify topic key terms, such as latent Dirichlet allocation (LDA) topic models or biterm topic models.

For example, for a given grouping of collected medical documents, topic proportions and assignments may be made and organized within each document. The assignments may be made by identifying particular words in each document, such as gene, DNA and genetic which would make up one organized category or topic of the document. Another grouping of identified words in each document may include brain, neuron and nerve and these may make up another organized category or topic. A third organized category grouping may include the words life, evolve and organism. Each document reviewed may have the topic words identified throughout each document.

At 206, a heatmap is generated. A heatmap may be generated based on the content that is read by users. The heatmap may provide, at a fine level, the regions of the documents that have been read. A fine level may indicate a granular level to show the generated heatmap on particular regions of the document as opposed to over the whole document. The heatmap may be generated, for example, using a front facing camera on a laptop or smart device to display the read portions of the documents using images of colors splashed on the document. The camera may capture where and what regions of the document a user's eyes may be looking at. The length of time a user may be looking at one or more regions may also be captured, stored and analyzed. In a case when a user is reading the document aloud, the read aloud portions may be captured by a microphone and the corresponding regions may be identified accordingly.

For example, a heatmap image of red and orange overlying colors over parts of a document that are the more read and accessed portions of the document while the rest of the document that is not read and accessed remain normal, with no overlaying colors. The overlaid color portions may vary in an intensity level of the color and in a transparency level of the color. The density of the color and the transparency of the color may relate to the level of popularity or demand for the document (i.e., how often the document is accessed). The higher the density or the less transparent the color is may indicate an area of the document that is highly popular, often accessed and often viewed. Various colors may be used to reflect the areas of the document that are most read or have the most traffic.

At 208, a content relevancy model (CRM) is created. The CRM may be built or created using the collected data, the topic model content and the generated heatmap. For example, the data inputs used to build the CRM include the document access frequency, the topic model, the cartesian coordinates of the heat map and the duration of the user's gaze on the document. The CRM may be built, for example, using a logistic regression model to assign a probability state between 0 and 1 to 4 possible action states. One action state may be to stay as-is, the next action state may be to require a content boost to increase propagation, the next action state may be to update portions of the document of the metadata of the document and republish the document and the final action state may be to retire the document.

If the action state is stay as-is, then that may indicate not to make any changes to the content or document. If the action state is requiring a content boost to increase propagation, then that may indicate, for example, promoting the document or the content on a social media platform. If the action state is to update a portion of the document, the content or the metadata, then the relevant portions that need updating will be made and the document, the content or the metadata may be republished with the updates. If the action state is retired, then the document or the content may be removed. An example of the probability states for the 4 possible action states is shown at Table 1 below.

TABLE 1

| Probability Threshold | Document Access Interarrival Time | Topic Bundle 1 (log likelihood) | Topic Bundle 2 (log likelihood) | Topic Bundle 3 (log likelihood) | Heat Map (x) | Heat Map (y) | Heat Map Duration |
|---|---|---|---|---|---|---|---|
| 0.89 | 5700 | 0.783 | 0.789 | 0.986 | 24 | 48 | 99 |
| 0.52 | 2300 | 0.456 | 0.456 | 0.568 | 64 | 23 | 42 |
| 0.21 | 125 | 0.123 | 0.12 | 0.001 | 21 | 12 | 6 |

The probability indicates action states represented between 0 and 1. The document access interarrival time indicates a date or a timestamp unit for the ability to identify each instance to the second of when a document is accessed. The topic bundles 1-3 (log likelihoods) indicate a set of indexed distributions based on topics. The topic bundles 1-3 may include, for example, a collection of 5-10 words that are closely associated with each other. The topic bundle may include the output of the topic modeler, such as the LDA and the table may represent a mean log likelihood score for the 5-10 terms mined from the topic modeler. The heat map coordinates (x,y) indicate a location of a region or topic in the document that the user may typically indicate by a page number, a section or the table of contents. The heat map duration indicates how long a user is gazing at a section of the document and the units are a total number of words or topics. A model may be created, and multipliers may be computed using a regression model. For example, parameter coefficients of the regression model may be provided as part of the regression model output as model log(y)=intercept+ 0.345 (parameter1)+0.12 (parameter2)+6.89 (parameter3).

At 210, the CRM is used to determine an action state. The CRM may be used to determine whether the content should stay as-is, require a content boost to increase propagation, update portions of the content and republish, update the metadata and republish or retire the content by using predetermined thresholds. For example, the calculations from step 208 may be used with the following threshold parameters in Table 2.

TABLE 2

| Probability Threshold | Action |
|---|---|
| 1-0.75 | Content should stay as is. |
| 0.74-0.50 | Content should be re-shared, promoted or boosted on a technical forum or social media platform. |
| 0.49-0.25 | Content requires updates on portions of the document or the metadata (e.g., in the database schema manual page 17, paragraph 2 requires a refresh. |
| 0.24-0 | Content should be retired. |

At 212, the CRM is stored for future forecasting trends. The CRM may be stored on a database and the results from the transactions may be captured and stored. The results from the transactions may include, for example, the results of the determination made at step 210 or other associated metadata captured and analyzed during the process. The stored CRM and transaction results may be used to build a lifecycle model and trend visualizations for future forecasting. Additionally, the results of the CRM model may be refreshed as more data is collected to ensure that the model is kept updated (i.e., topped up) with the most precise model coefficients as more data is added to the document database or corpora.

It may be appreciated that FIG. 2 provides only an illustration of one embodiment and do not imply any limitations with regard to how different embodiments may be implemented. Many modifications to the depicted embodiment(s) may be made based on design and implementation requirements.

Figure 3:
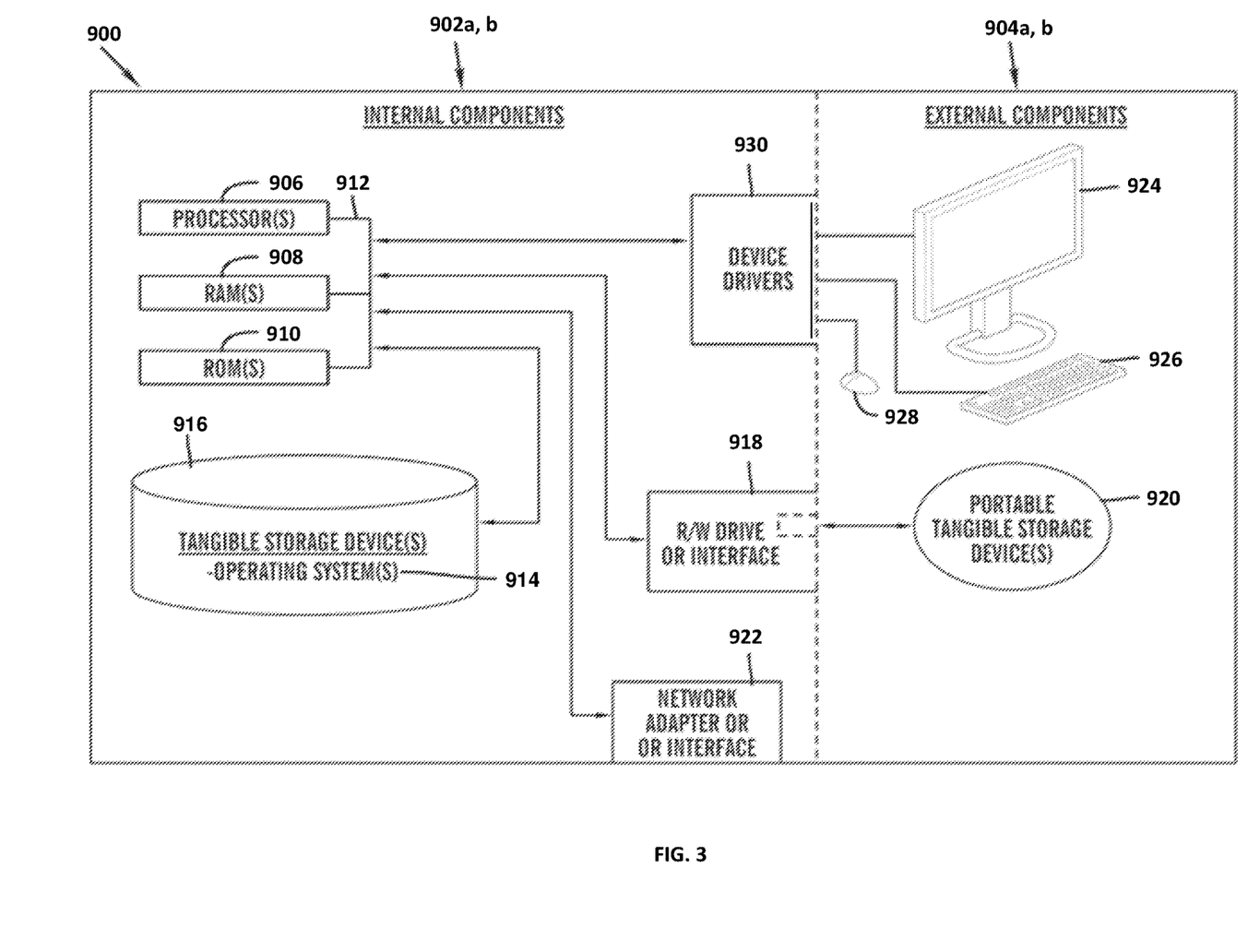
FIG. 3 is a block diagram of internal and external components of computers and servers depicted in FIG. 1 according to at least one embodiment.

FIG. 3 is a block diagram 900 of internal and external components of computers depicted in FIG. 1 in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may be represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 a, b and external components 904 a, b illustrated in FIG. 3. Each of the sets of internal components 902 a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the content relevancy program 110a in client computer 102, and the content relevancy program 110b in network server 112, may be stored on one or more computer-readable tangible storage devices 916 for execution by one or more processors 906 via one or more RAMs 908 (which typically include cache memory). In the embodiment illustrated in FIG. 3, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the content relevancy program 110a, 110b can be stored on one or more of the respective portable computer-readable tangible storage devices 920, read via the respective R/W drive or interface 918 and loaded into the respective hard drive 916.

Each set of internal components 902 a, b may also include network adapters (or switch port cards) or interfaces 922 such as a TCP/IP adapter cards, wireless wi-fi interface cards, or 3G or 4G wireless interface cards or other wired or wireless communication links. The software program 108 and the content relevancy program 110a in client computer 102 and the content relevancy program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the content relevancy program 110a in client computer 102 and the content relevancy program 110b in network server computer 112 are loaded into the respective hard drive 916. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices. Each of the sets of internal components 902 a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure or on a hybrid cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Analytics as a Service (AaaS): the capability provided to the consumer is to use web-based or cloud-based networks (i.e., infrastructure) to access an analytics platform. Analytics platforms may include access to analytics software resources or may include access to relevant databases, corpora, servers, operating systems or storage. The consumer does not manage or control the underlying web-based or cloud-based infrastructure including databases, corpora, servers, operating systems or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
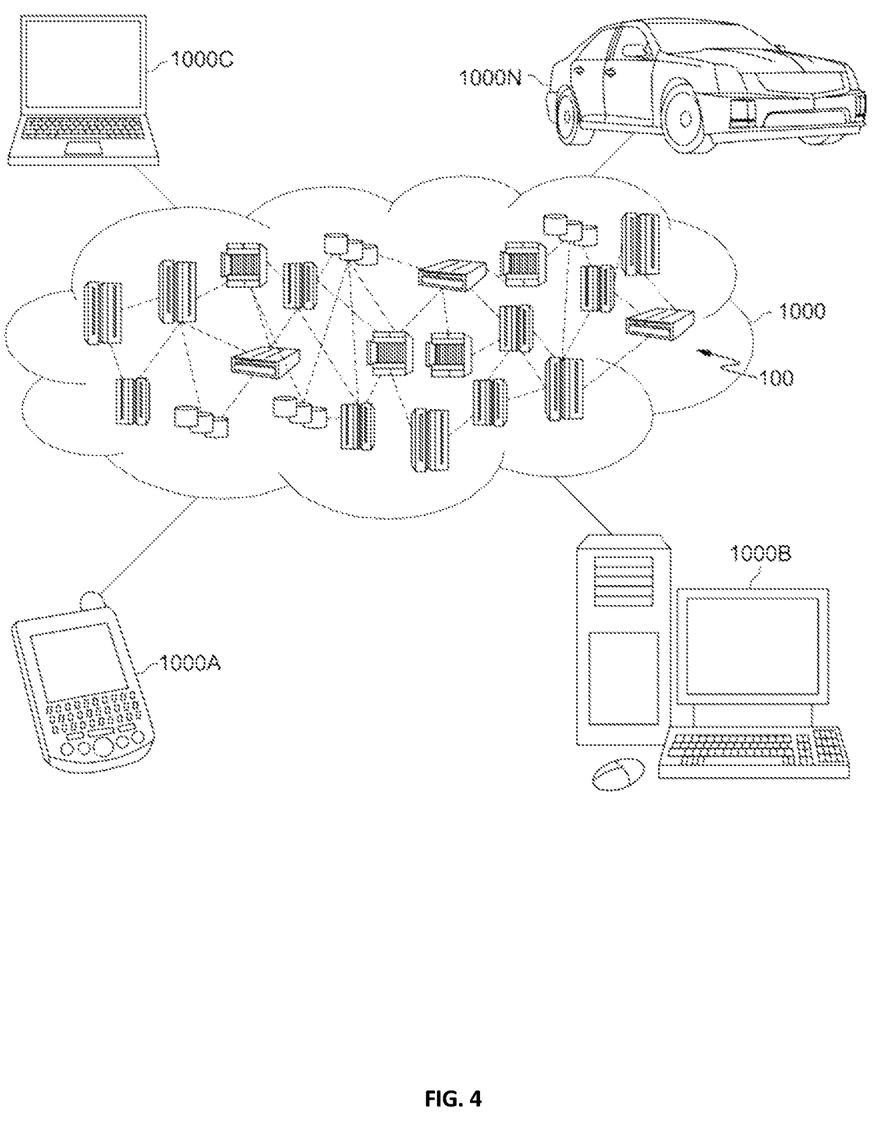
FIG. 4 is a block diagram of an illustrative cloud computing environment including the computer system depicted in FIG. 1, in accordance with an embodiment of the present disclosure.

Referring now to FIG. 4, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 4 are intended to be illustrative only and that computing nodes 100 and cloud computing environment 1000 can communicate with any type of computerized device over any type of network and/or network addressable connection (e.g., using a web browser).

Figure 5:
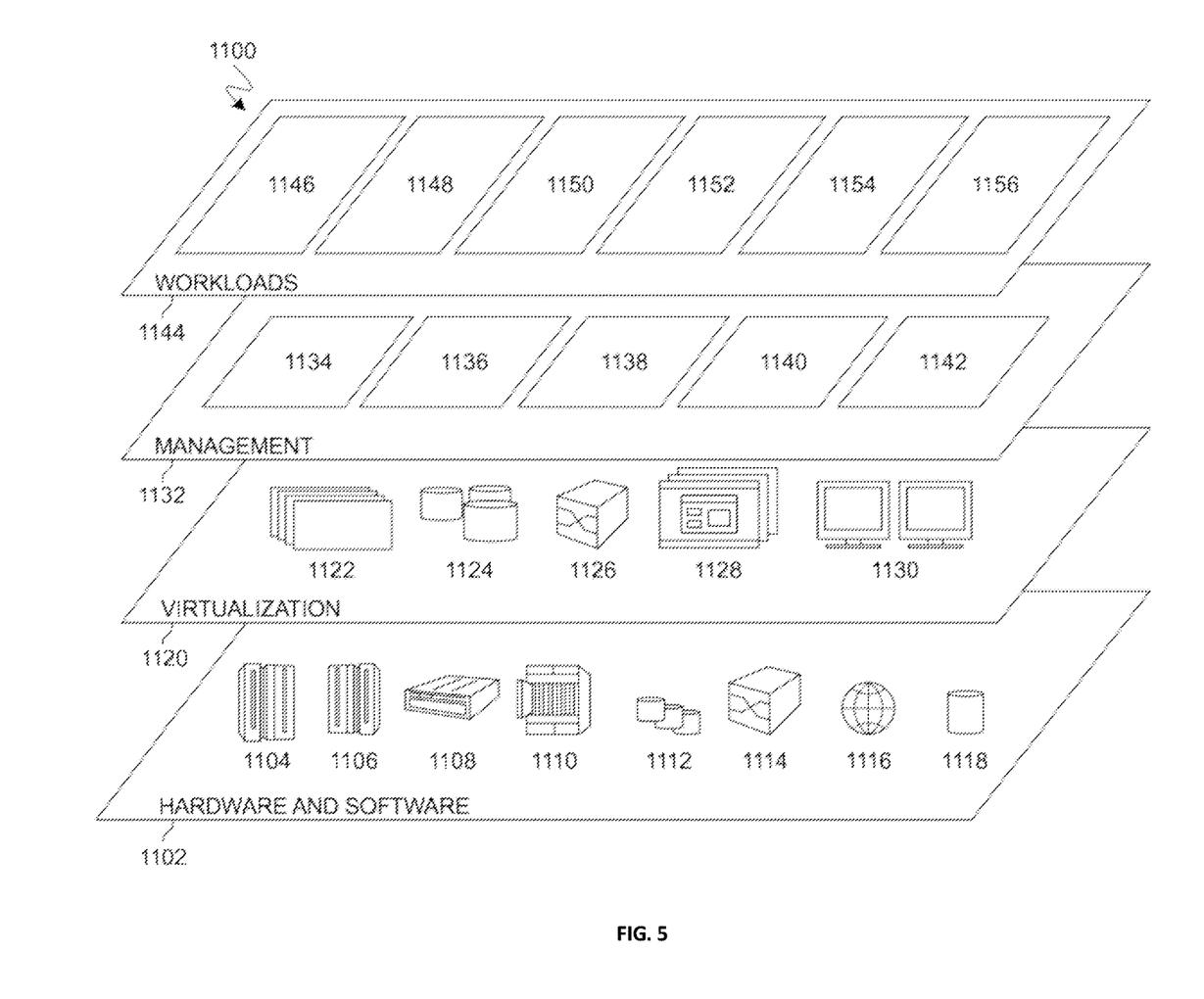
FIG. 5 is a block diagram of functional layers of the illustrative cloud computing environment of FIG. 4, in accordance with an embodiment of the present disclosure.

Referring now to FIG. 5, a set of functional abstraction layers 1100 provided by cloud computing environment 1000 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and determining content relevancy 1156. A content relevancy program 110a, 110b provides a way to detect and improve content relevancy in content management systems.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language, python programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for managing content relevancy, the method comprising:
   collecting a plurality of data, wherein the plurality of data includes document data, document access data and user data;
   analyzing the plurality of data;
   retrieving topic model content based on the plurality of data;
   building a machine learning (ML) model to determine one or more topics contained in the topic model content;
   generating a heatmap based on the user data;
   building a content relevancy model (CRM) based on the ML model and the heatmap;
   determining an action state for the document data using the CRM, wherein the action state is based on a logistic regression value probability threshold range from stay as-is, promote and reshare, update and refresh, and retire at least a portion of the document data, wherein the document data is published digital content; and
   storing the CRM.

2. The method of claim 1, wherein the document data includes information relating to a document content, a document topic, a document domain or a document subject matter, wherein the document access data includes information relating to when, by whom, how often or for what purpose a document is accessed.

3. The method of claim 1, wherein the topic model content includes analytics engine data and crowdsourced data.

4. The method of claim 1, wherein the ML model determines a plurality of topics contained in the document data and the document access data.

5. The method of claim 1, wherein the heatmap is generated based on a plurality of content read by the user, wherein the plurality of content read by a user is captured with a front facing camera.

6. The method of claim 1, wherein the action state is updating metadata of a document.

7. A computer system for managing content relevancy, comprising:
one or more processors, one or more computer-readable memories, one or more computer-readable tangible storage media, and program instructions stored on at least one of the one or more computer-readable tangible storage media for execution by at least one of the one or more processors via at least one of the one or more computer-readable memories, wherein the computer system is capable of performing a method comprising:
collecting a plurality of data, wherein the plurality of data includes document data, document access data and user data;
analyzing the plurality of data;
retrieving topic model content based on the plurality of data;
building a machine learning (ML) model to determine one or more topics contained in the topic model content;
generating a heatmap based on the user data;
building a content relevancy model (CRM) based on the ML model and the heatmap;
determining an action state for the document data using the CRM, wherein the action state is based on a logistic regression value probability threshold range from stay as-is, promote and reshare, update and refresh, and retire at least a portion of the document data, wherein the document data is published digital content; and
storing the CRM.

8. The computer system of claim 7, wherein the document data includes information relating to a document content, a document topic, a document domain or a document subject matter, wherein the document access data includes information relating to when, by whom, how often or for what purpose a document is accessed.

9. The computer system of claim 7, wherein the topic model content includes analytics engine data and crowdsourced data.

10. The computer system of claim 7, wherein the ML model determines a plurality of topics contained in the document data and the document access data.

11. The computer system of claim 7, wherein the heatmap is generated based on a plurality of content read by the user, wherein the plurality of content read by a user is captured with a front facing camera.

12. The computer system of claim 7, wherein the action state is updating metadata of a document.

13. A computer program product for managing content relevancy, comprising:
one or more computer-readable tangible storage media and program instructions stored on at least one of the one or more computer-readable tangible storage media, the program instructions executable by a processor to cause the processor to perform a method comprising:
collecting a plurality of data, wherein the plurality of data includes document data, document access data and user data;
analyzing the plurality of data;
retrieving topic model content based on the plurality of data;
building a machine learning (ML) model to determine one or more topics contained in the topic model content;
generating a heatmap based on the user data;
building a content relevancy model (CRM) based on the ML model and the heatmap;
determining an action state for the document data using the CRM, wherein the action state is based on a logistic regression value probability threshold range from stay as-is, promote and reshare, update and refresh, and retire at least a portion of the document data, wherein the document data is published digital content; and
storing the CRM.

14. The computer program product of claim 13, wherein the document data includes information relating to a document content, a document topic, a document domain or a document subject matter, wherein the document access data includes the information relating to when, by whom, how often or for what purpose a document is accessed.

15. The computer program product of claim 13, wherein the topic model content includes analytics engine data and crowdsourced data.

16. The computer program product of claim 13, wherein the ML model determines a plurality of topics contained in the document data and the document access data.

17. The computer program product of claim 13, wherein the heatmap is generated based on a plurality of content read by the user, wherein the plurality of content read by a user is captured with a front facing camera.

* * * * *